United States Patent [19]
De Vaan

[11] Patent Number: 6,018,214
[45] Date of Patent: Jan. 25, 2000

[54] ILLUMINATION SYSTEM FOR AN IMAGE PROJECTION DEVICE

[75] Inventor: Adrianus J. S. M. De Vaan, Eindhoven, Netherlands

[73] Assignee: U.S. Philips Corporation, New York, N.Y.

[21] Appl. No.: 09/005,625

[22] Filed: Jan. 9, 1998

[30] Foreign Application Priority Data

Jan. 10, 1997 [EP] European Pat. Off. .............. 97200069

[51] Int. Cl.[7] ................................................. G02B 27/10
[52] U.S. Cl. .......................... 313/112; 362/19; 362/247; 353/20; 349/9
[58] Field of Search ..................... 313/634, 571, 313/639, 642, 112, 113; 362/19, 247; 353/20, 94; 349/9

[56] References Cited

U.S. PATENT DOCUMENTS

| | | | |
|---|---|---|---|
| 4,638,309 | 1/1987 | Ott | 340/752 |
| 4,716,337 | 12/1987 | Huiskes et al. | 313/487 |
| 5,029,986 | 7/1991 | De Vaan | 350/358 |
| 5,098,184 | 3/1992 | van den Brandt et al. | 353/102 |
| 5,394,204 | 2/1995 | Shigeta et al. | 353/94 |
| 5,486,884 | 1/1996 | De Vaan | 353/122 |
| 5,765,934 | 6/1998 | Okamori et al. | 353/94 |

FOREIGN PATENT DOCUMENTS

| | | | |
|---|---|---|---|
| 0124175 | 7/1986 | European Pat. Off. | H01J 61/44 |
| 0286184 | 5/1988 | European Pat. Off. | G02F 1/137 |
| 0576071 | 12/1993 | European Pat. Off. | H01J 61/82 |
| 0295913 | 4/1994 | European Pat. Off. | G02F 1/13 |
| WO9605534 | 2/1996 | WIPO | G02B 27/28 |

OTHER PUBLICATIONS

"Polarizing beam splitters for infrared and millimeter waves using single–layer–coated dielectric slab or unbacked films" by R.M.A. Azzam in Applied Optics, vol. 25, No. 23, Dec. 1986.

*Primary Examiner*—Michael Day
*Attorney, Agent, or Firm*—F. Brice Faller

[57] ABSTRACT

The illumination system (21) includes two radiation sources (23, 25) and an optical system for concentrating the radiation into beams, a common polarizing system (11) for splitting the beams ($b_I$, $b_{II}$) into linearly polarized sub-beams, and at least one polarization-rotating element (35). The polarizing system includes at least one optically transparent plate (11) having a refractive index $n_0$ and a first face and a second face. At least one of these faces is provided with an optically thin layer having a refractive index $n_1$ which is larger than $n_0$. The light path of the sub-beams whose directions of polarizations are not to be converted incorporates a reflector (41, 43) for reflecting the sub-beams into the same direction of propagation as that of the other sub-beams. The chief ray of these beams and the normal on the plate (11) enclose an angle which is substantially equal to the Brewster angle which holds for the interface between the optically thin layer and a medium surrounding the polarizing element (11).

5 Claims, 4 Drawing Sheets

ILLUMINATION SYSTEM FOR AN IMAGE PROJECTION DEVICE

BACKGROUND OF THE INVENTION

The invention relates to an illumination system for supplying a polarized radiation beam, which system successively comprises a radiation source unit and an optical system for concentrating the radiation to a beam, a polarizing system for splitting a radiation beam generated by the radiation source unit into linearly polarized sub-beams, and at least one polarization-rotating element. The polarizing system includes at least one optically transparent plate having a refractive index $n_0$ and a first face and a second face, while at least one of the faces is provided with an optically thin layer having a refractive index $n_1$ which is larger than $n_0$. The light path of at least one of the sub-beams incorporates a reflector for reflecting this sub-beam into the same direction of propagation as that of the other sub-beam. The chief ray of said beam and the normal on the plate enclose an angle which is substantially equal to the Brewster angle which holds for the interface between the optically thin layer and a medium surrounding the polarizing element.

The invention also relates to an image projection device comprising such an illumination system.

An illumination system of the type described in the opening paragraph is known from PCT patent application WO 96/05534. The illumination system described in this document comprises a polarizing beam splitter which, in combination with a polarization-rotating element, substantially completely converts the unpolarized radiation beam emitted by the radiation source into a radiation beam having a single linear direction of polarization. The beam splitter consists of an optically transparent plate, at least one face of which is provided with an optically thin layer having a refractive index $n_1$ which is larger than that of the plate. The light path of at least one of the sub-beams incorporates a reflector for reflecting this sub-beam into the same direction of propagation as that of the other sub-beam. Furthermore, the chief ray of the beam of the radiation source and the normal on the plate enclose an angle which is substantially equal to the Brewster angle which holds for the interface between the optically thin layer and a medium surrounding the polarizing element.

The polarizing element is known per se, for example from the article: "Polarizing beam splitters for infrared and millimeter waves using single-layer-coated dielectric slab or unbacked films" by R. M. A. Azzam in Applied Optics, vol. 25, No. 23, December 1986.

A polarization-rotating element is present in one of the sub-beams. The polarization-rotating element ensures that the two components have the same direction of polarization so that substantially the complete beam of the radiation source is converted into a beam having the same linear direction of polarization.

A short-arc gas discharge lamp is generally used as a radiation source because relatively small and inexpensive systems having a relatively high light output can be made in that way. In fact, the compact gas discharge arc can collect a large quantity of light in a relatively small light beam.

A drawback of the known illumination system is that the lifetime of the gas discharge lamp is very much dependent on the power supplied to the lamp. For current UHP lamps, for example of the Philips trademark, the lifetime is approximately 4000 hours, for example for a power of 100 watts. When increasing the power, the lifetime will become undesirably short.

SUMMARY OF THE INVENTION

It is an object of the invention to provide an illumination system in which substantially the complete radiation beam from the radiation source unit is converted into a beam having the same direction of polarization, and in which the light output will be approximately twice as large without affecting the lifetime of the radiation source unit. Moreover, this illumination system can be realized in a relatively simple manner.

To this end, the radiation source unit comprises two radiation sources, and such a polarizing system is associated with each radiation source.

By making use of two radiation sources, a light output which is twice as large is realized because the supplied power can be doubled. A polarization conversion system in which the polarizers are implemented as transparent optical plates is very suitable to implement the projection system also in a compact form. Moreover, the use of two projection lamps has the advantage that, when one of the lamps drops out, a light output similarly as in the current illumination systems is still realized.

According to a preferred embodiment, the two radiation sources have a common polarizing system. In this way, a compact illumination system having a high brightness is realized. Provided that the two radiation sources are situated at different and suitable heights, four light spots which are geometrically separated from each other will be produced in the exit window of the illumination system.

According to a further embodiment, the radiation sources are high-pressure mercury vapor discharge lamps comprising a lamp vessel of quartz glass, a part of which surrounds a discharge space;

tungsten electrodes provided in the lamp vessel, which electrodes are separated from each other, define a discharge path and are connected to current conductors extending beyond the lamp vessel;

a filling of at least 0.2 mg Hg/mm$^3$, 10$^{-6}$–10$^{-4}$ μmol Hal/mm$^3$, in which Hal is one of the materials from the group of Cl, Br and I, and a rare gas in the lamp vessel, the discharge space having a spheroid shape with a dimension S in the direction of the discharge path and being equal to S(mm)=e·$D_i$ in which e has a value in the range between 1.0 and 1.8, $D_i$(mm)=f·[3.2+0.011 (mm/W)·P(W)]

in which $D_i$ is the largest value of the diameter perpendicular to the discharge path, f has a value in the range between 0.9 and 1.1, P is the power used at nominal operation in the range between 70 and 200 W, the part of the lamp vessel surrounding the discharge space has a convex outer surface which, in a plane in which $D_i$ is located, has a diameter $D_0$ which is given by $D_0$(mm)≧3.2+0.055 (mm/W)·P(W), the length of the discharge path $D_P$ is in the range between 1.0 and 2.0 mm and the selected halogen is Br.

This lamp has a short arc length in combination with a lifetime of several thousand hours and can therefore be used to great advantage as a radiation source in an illumination system according to the invention in which a polarizing element is used which optimally functions when the incident beam has a narrow divergence.

It is to be noted that a lamp of this type is known per se from European patent application EP-A 0 576 071, to which U.S. Pat. No. 5,497,049 corresponds.

The invention also relates to an image projection device comprising an illumination system for supplying a polarized radiation beam, at least one display panel arranged in the path of this beam for generating an image to be projected, and a projection lens system for projecting the image on a projection screen. This device is characterized in that the illumination system is an illumination system as described hereinbefore.

A preferred embodiment of the image projection device according to the invention is characterized in that an optical integrator is arranged in the light path between the polarizing element and the display panel.

An optical integrator is known per se from, for example U.S. Pat. No. 5,098,184 in the name of the applicant. By arranging such an optical integrator in the light path between the polarizing element and the display panel, inter alia, a uniform light distribution across the light beam can be realized so that the homogeneity of the image formed is enhanced.

However, an optical integrator can be used to extra advantage in an illumination system according to the invention. Since the linearly polarized beam supplied by the polarizing system consists of the combination of sub-beams which have covered a different path between the radiation source and the place where they are joined to a single beam again, the intensity distribution across the composite beam will not be constant. Due to the presence of the integrator, the intensity is spread across the total beam in such a way that a uniform distribution is obtained at the area of the display panel, which contributes to a better homogeneity of the image to be formed.

According to a further embodiment the display panel is a DMD panel and the projection screen is a polarizing screen having a direction of polarization which corresponds to the direction of polarization of the illumination beam supplied by the illumination system.

The display panel, or the three display panels in the case of color image projection, may be implemented with a liquid crystalline material. For such panels, the incident radiation should be polarized because the image information to be projected is added by modulating the state of polarization of the beam incident on the panel in conformity with the image information. The modulated radiation beam is subsequently projected on an image projection screen via a projection lens system.

The state of polarization which is desired for the incident beam may be linear or circular, dependent on the used polarizer and analyzer which form part of the display panel. When a "circular" display panel is used, i.e. a panel modulating the circular state of polarization of a radiation beam, for example, a $\lambda/4$ plate should be arranged between the above-described illumination system and the display panel so as to convert the linear state of polarization supplied by the illumination system into a circular state of polarization.

Instead of using a liquid crystal panel (LCD panel) as a display panel, use may be alternatively made of a DMD (Digital Micromirrored Device) panel. For an example of a known application of a DMD panel in a video projection system, reference is made to U.S. Pat. No 4,638,309.

A DMD is a semiconductor element which is made of a single silicon wafer and comprises a matrix of deformable mirror elements. Each mirror element may tilt in conformity with a voltage which is applied thereto and represents the image information to be displayed. In this way, radiation incident on the matrix of mirror elements is reflected at different angles into or out of the projection system. Subsequently, the radiation reflected in the system is concentrated to a beam by means of an optical system and converted into a projected image via a projection lens system. In this case, the image information to be reproduced is thus derived from the angles at which the incident radiation has been reflected by the mirror elements, and is not derived from the modulation of the state of polarization presented to the panel. When a linearly polarized beam is applied to a DMD panel, the state of polarization will not change as a result of the addition of image information, in other words, by the reflection on the mirror elements. When a polarizing image projection screen is used in the projection, whose direction of polarization corresponds to that of the beam supplied by the combination of the polarizing element and the polarization-rotating element, then substantially 50% of the ambient light will be blocked by the screen while substantially all signal light will be passed on to the viewers. Consequently, a projected image having a considerably raised contrast is obtained.

These and other aspects of the invention are apparent from and will be elucidated with reference to the embodiments described hereinafter.

DESCRIPTION OF THE PREFERRED EMBODIMENTS

Figure 1:
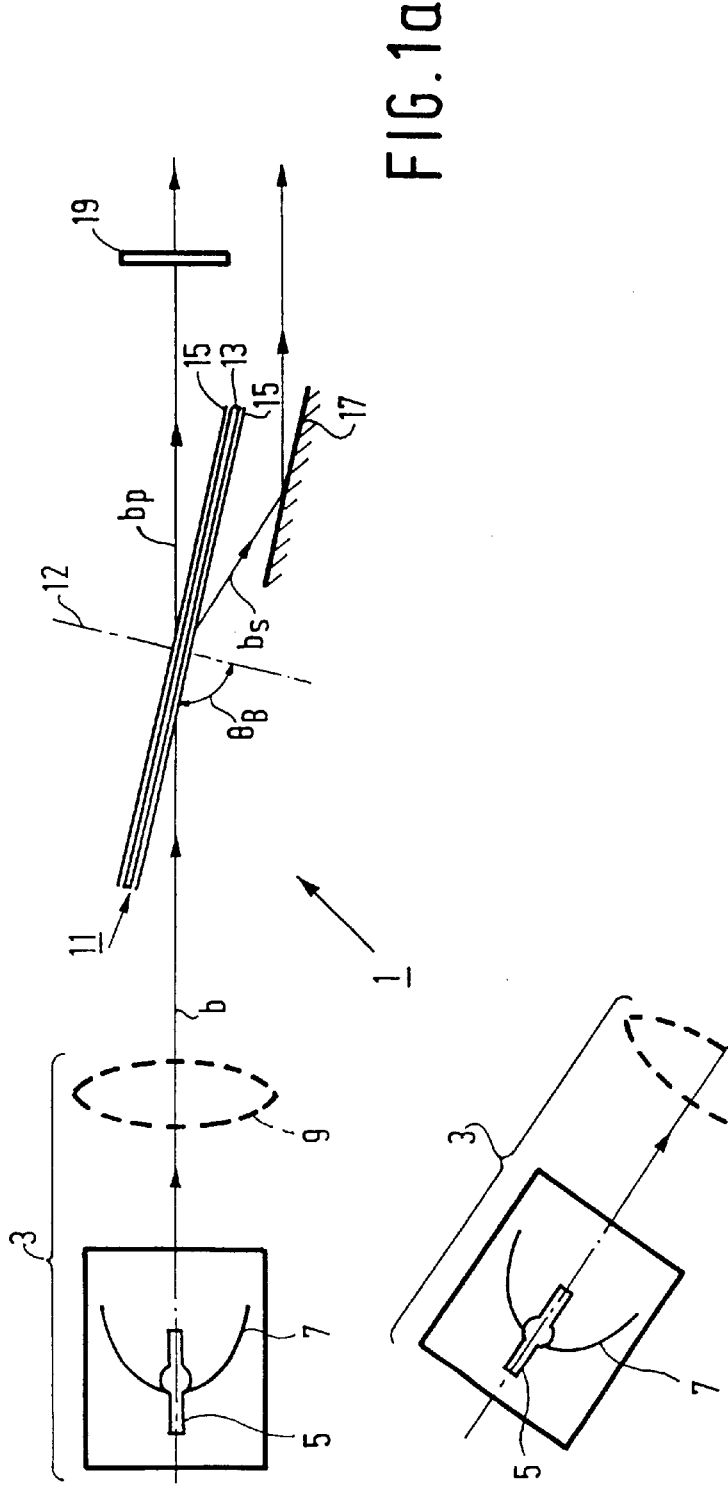
FIGS. 1a and 1b show two embodiments of an illumination system with a single radiation source, illustrating how a polarizing element in the form of a transparent plate can be illuminated.

FIGS. 1a and 1b show two embodiments of a known illumination system 1. The illumination system 1 comprises a radiation source unit 3 with a lamp 5 and a reflector 7. The lamp 5 emits light into the direction of the object to be illuminated, for example a display panel, and into the backward direction. The reflector 7 ensures that the light emitted backwards is collected and will as yet be sent into the direction of the object. The reflector 7 may be, for example self-collimating. If this is not the case, an extra collimating lens 9 is required to concentrate the light emitted by the lamp 5 to a parallel beam b. This parallel beam b, only the chief ray of which is shown, is subsequently incident on a polarizing element 11.

The polarizing element 11 consists of an optically transparent plate 13 having a refractive index $n_0$ and provided on at least one side with an optically thin layer 15 having a refractive index $n_1$, for which it holds that $n_1 > n_0$. Such an element, which is provided with an optically thin layer on both sides, is known per se from the article: "Polarizing beam splitters for infrared and millimeter waves using single-layer-coated dielectric slab or unbacked films" by R. M. A. Azzam in Applied Optics, vol. 25, No. 23, December 1986. The optically thin layer may consist of, for example $TiO_2$, $CeO_2$ or $ZnS_2$. Such a polarizing element can be manufactured in a relatively easy way by vapor deposition or immersion. Moreover, these materials are resistant to very high temperatures.

When an illumination beam is incident on such a polarizing element 11, with the chief ray of the beam b and the normal 12 on the element 11 enclosing an angle for which light which is s-polarized will be reflected from the beam b as beam $b_s$, while light which is p-polarized will be transmitted as beam $b_p$, two mutually perpendicular linearly polarized sub-beams will be formed. This angle is substantially equal to the Brewster angle $\theta_B$ for the interface between air and the optically thin layer provided on the transparent plate. For this angle, the reflection of the s-polarized light is substantially 80%, while the reflection of p-polarized light is only approximately 2%. The value of the Brewster angle for the interface between air and the optically thin layer is determined by the refractive index $n_1$ of the thin optical layer 15 provided on the transparent plate 13 in conformity with the formula: $\tan \theta_B = n_1$. If the polarizing element is present in a medium other than air, the Brewster angle will also be dependent on the refractive index of this medium.

Furthermore, a reflecting element 17 is provided so as to send the sub-beam reflected away from the original beam b into the direction of propagation of this beam b again. In this way, two parallel sub-beams are formed which are mutually perpendicular linearly polarized. By providing a polarization-rotating element 19 in one of these two sub-beams, for example in the form of a $\lambda/2$ plate or a liquid crystalline layer having a molecular ordering rotating the direction of polarization through 90°, the two directions of polarization can be made equal to each other. In this way, substantially the complete beam from the radiation source unit 3 is thus converted into a linearly polarized beam having a single direction of polarization.

If a circularly polarized beam is desired, a $\lambda/4$ plate may be placed between the combination of the polarizing element 11 and the polarization-rotating element 19 and the object to be illuminated. The linearly polarized beam can thereby be converted into a circularly polarized beam. This may be necessary, for example for a display panel operating with circularly polarized light.

FIG. 1a shows an embodiment of the illumination system 1 in which the s-polarized beam component is reflected by the reflecting element 17 into the direction parallel to that of the original beam, while this is the case for the p-polarized component in FIG. 1b. Dependent on the desired final polarization, p or s, of the beam to be transmitted to a display panel, the polarization-rotating element 19 is placed in the s or p-polarized sub-beam. In both FIGS. 1a and 1b, the beam supplied by the illumination system 1 is s-polarized.

By providing the transparent plate with an optically thin layer on its first side and its second side, the polarization-separating effect may be enhanced. For example, the reflection for the s-polarized beam component may be very high, namely approximately 80%, and the reflection for the p-polarized beam component may be very low, namely approximately 2%. Then, only a small quantity of s-polarized light, together with the p-polarized beam component, will be passed by the polarizing element.

Figure 2:
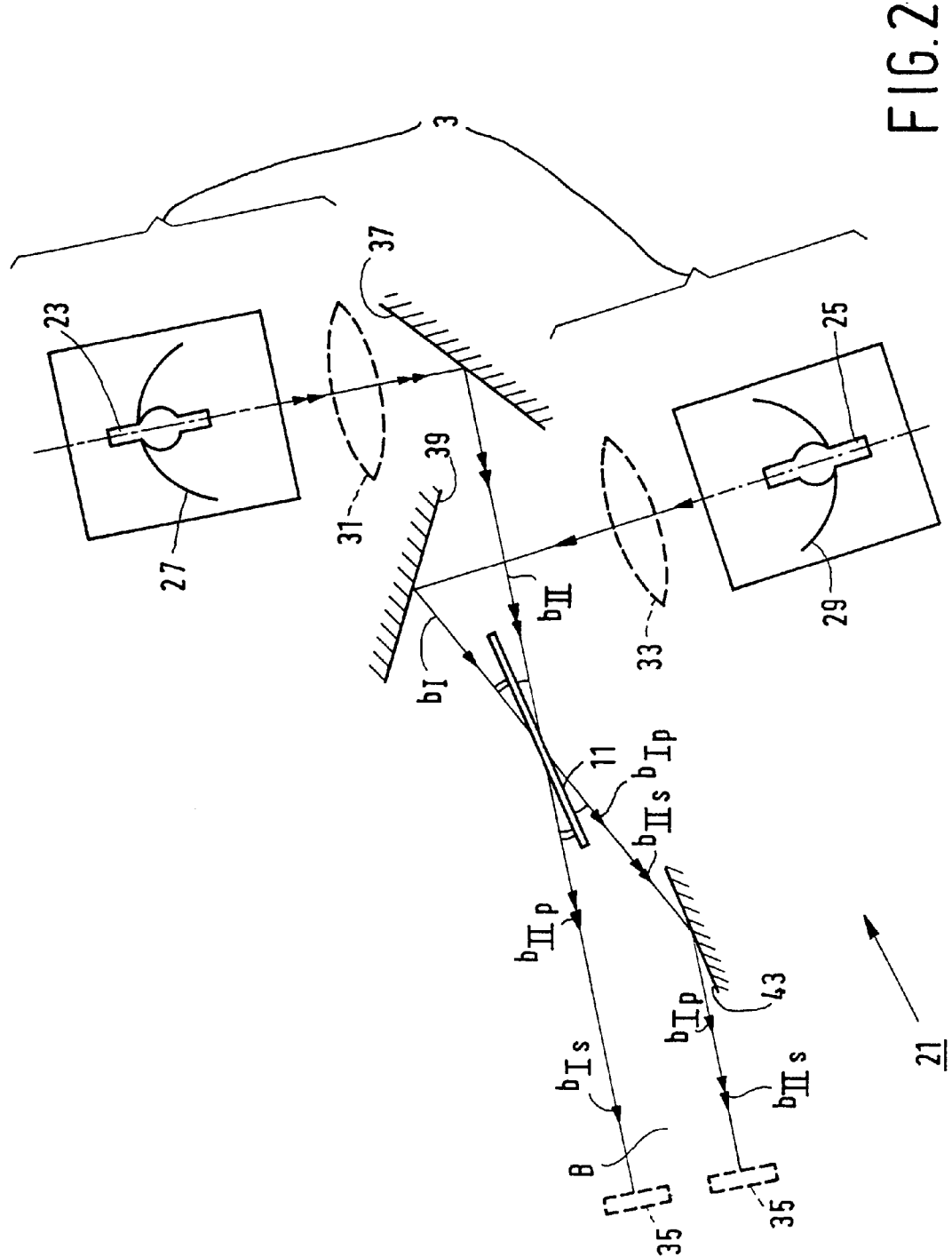
FIG. 2 shows diagrammatically an embodiment of an illumination system according to the invention.
Figure 3:
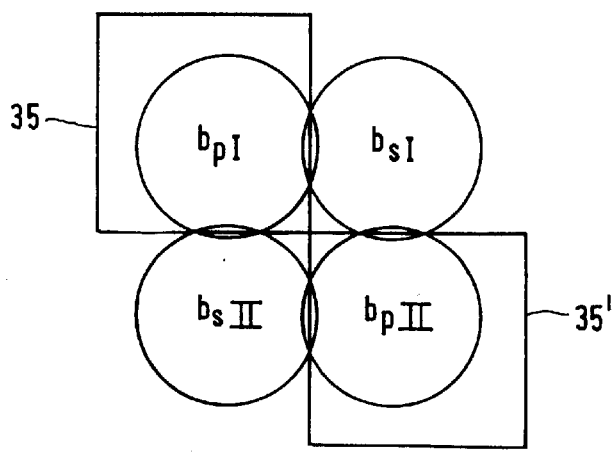
FIG. 3 shows the light distribution in the exit window of the illumination system.

FIG. 2 is a plan view of an embodiment of an illumination system 21 according to the invention. Corresponding components in FIG. 1 are denoted by the same reference numerals. The illumination system 21 now comprises a radiation source unit 3 with two light sources 23, 25. Consequently, there are two illumination beams $b_I$ and $b_{II}$, in which $b_I$ illuminates the polarizing element in accordance with FIG. 1a and $b_{II}$ illuminates the polarizing element in accordance with FIG. 1b. Each light source is at least partly surrounded by a reflector 27, 29. If the reflectors 27, 29 are not self-collimating, an extra condensor lens 31, 33 is present in the light path. In this case, the polarizing element 11 is irradiated with two light beams $b_I$ and $b_{II}$ each emitted by a different light source. It is possible to ensure that the two radiation sources 23, 25 are positioned at different heights with respect to the plane of the drawing, such that four substantially geometrically separated light beams $b_{pI}$, $b_{sI}$, $b_{pII}$ and $b_{sII}$ are produced in the exit window of the illumination system. Such a light distribution is shown in FIG. 3. Subsequently, two equivalently polarized sub-beams, i.e. $b_{pI}$ and $b_{pII}$ or $b_{sI}$ and $b_{sII}$ may be incident behind the polarizing element 11 on a polarization-rotating element 35, dependent on whether an s-polarized or a p-polarized beam B is desired. Each polarizing element is not situated in but below or above the plane of the drawing. In the Figure, the polarization-rotating elements 35 are shown by way of a broken line because they are not situated in the plane of the drawing. The beam $b_1$ is denoted by a single arrow and the beam $b_{II}$ is denoted by a double arrow. In practice, the four beams are spatially separated from each other, one of the beams $b_{Is}$ and $b_{IIp}$ being situated above the plane of the drawing and the other one being situated below the plane of the drawing. The same applies to the beams $b_{IIs}$ and $b_{Ip}$. The two light paths between the polarizing element 11 and each of the light sources 23, 25 include a folding mirror 37, 39 for folding these light paths. In this way, a light beam having the same direction of polarization and a relatively high intensity is obtained with a compact system. The polarized sub-beams $b_{Ip}$ and $b_{IIs}$ are deflected parallel to the two other sub-beams by means of a reflector 43. The beam B supplied by the illumination system 21 will consequently be a substantially parallel beam having the same direction of polarization.

The extra space which is required in comparison with a system having a single light source is the space for the second light source because the light beams from the two light sources cross each other several times in the system.

Figure 4:
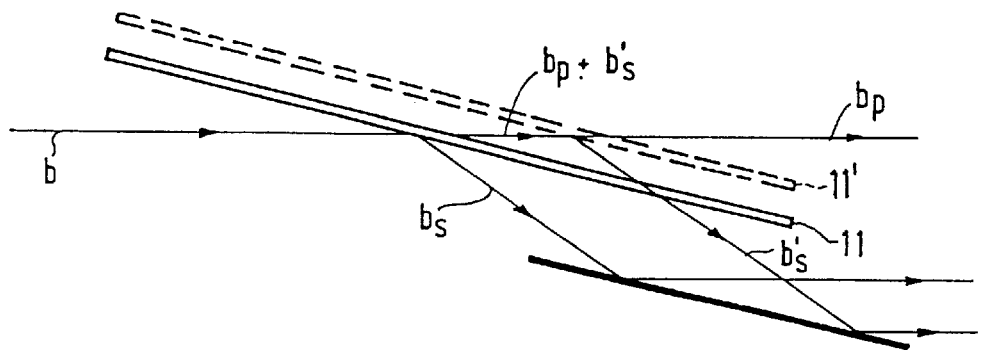
FIG. 4 shows the principle of operation of two stacked polarizing elements.

The polarization separation may be further optimized by stacking a plurality of polarizing elements. FIG. 4 shows the principle of operation of a polarization separator with two polarizing elements 11, 11'. At least a part of the s-polarized component $b_s'$ of the beam b which is transmitted together with the p-polarized component $b_p$ by the first polarizing element 11 is reflected on the second element 11'. The transmission of s-polarized light will decrease with an increasing number of polarizing elements.

As already described hereinbefore, the beam to be polarized should be incident on the polarizing element 11 at a given angle with respect to the normal 12 in order that polarization separation will occur. To realize an efficient polarization separation of the complete light beam, both the chief ray and the border rays of the beam should be incident on the polarizing element at or substantially at this angle of incidence. This can be achieved with a radiation source unit whose light beam has a narrow divergence, in other words, a light beam whose border rays enclose a relatively small angle with the chief ray.

A radiation source unit supplying a light beam having a narrow divergence is, for example a radiation source unit having a low throughput.

The term "throughput" characterizes the power of an optical system to transport radiation energy. This power is defined by $E = A \cdot \Omega$, in which A is the radiating surface and Ω is the spatial angle through which light is emitted, both measured at the location of the entrance aperture of the system in the center of this aperture. In an optical system, the throughput further down the system can no longer be increased but only reduced by blocking radiation so that radiation is then lost.

An example of a radiation source with which an illumination system having a relatively small throughput can be realized is a gas discharge lamp having a short arc length, which is surrounded by a reflector. Examples of such lamps are xenon lamps and short-arc metal halide lamps. However, both types of lamps have the drawback of a relatively short lifetime. Moreover, a xenon lamp may present the danger of explosion. A lamp having a short arc length, which is safe and also has a considerably longer lifetime (approximately 4000 hours at 100 watts) and is thus very suitable for use in combination with a polarizing element as described hereinbefore in the illumination system according to the invention, is the UHP (Ultra High Pressure) lamp. This lamp is known per se from the afore-mentioned EP-A 0 576 071.

Figure 5:
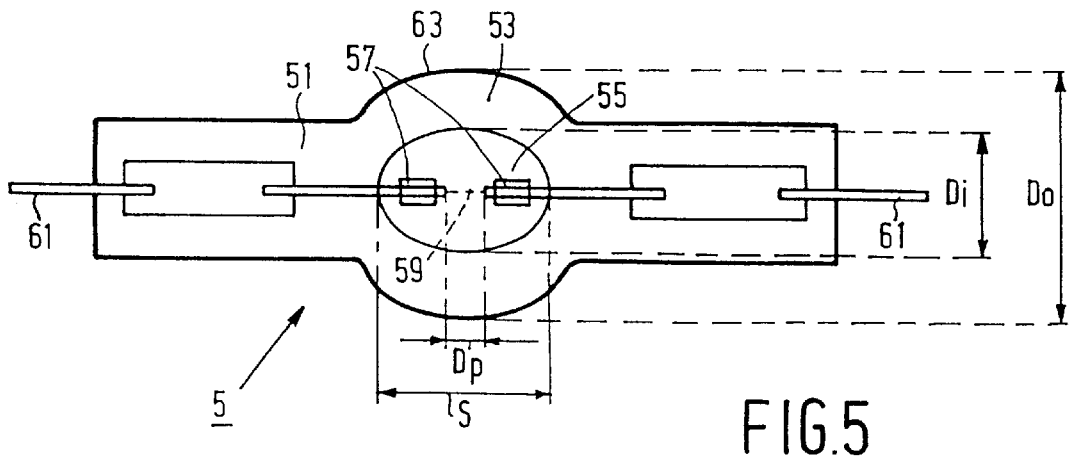
FIG. 5 shows diagrammatically a radiation source having a short arc length, suitable for a radiation source unit for use in an illumination system according to the invention.

FIG. 5 shows an embodiment of such a lamp. The lamp 3 has a lamp vessel 51 of quartz, a part 53 of which surrounds a discharge space 55. Two tungsten electrodes 57 separate from each other are arranged in the lamp vessel 51. The two electrodes 57 define a discharge path 59 and are connected to current conductors 61 which extend beyond the lamp vessel 51. The lamp vessel 51 is filled with at least 0.2 mg $Hg/mm^3$, $10^{-6}$–$10^{-4}$ μmol $Hal/mm^3$, in which Hal is one of the materials Cl, Br or I, and furthermore with a rare gas in the discharge space. The discharge space 55 has a spherical shape and a dimension S in the direction of the discharge path 59, defined by $S(mm)=e \cdot D_i$, in which e has a value in the range between 1.0 and 1.8, $D_i(mm)=f \cdot [3.2+0.011 (mm/W) \cdot P(W)]$ in which $D_i$ has the largest value for the diameter perpendicular to the discharge path 55, f has a value in the range between 0.9 and 1.1, P is the power consumed at nominal operation which is in the range between 70 and 200 W. The part 53 of the lamp vessel 51 surrounding the discharge space 55 has a convex outer surface 63 which, in a plane in which $D_i$ is located, has a diameter $D_0$ defined by $D_0(mm) \geq 3.2+0.055 (mm/W) \cdot P(W)$. The length $D_P$ of the discharge path 59 is in the range between 1.0 and 2.0 mm and the selected halogen is Br. For further details about the lamp described, reference is made to said European patent application.

Figure 6:
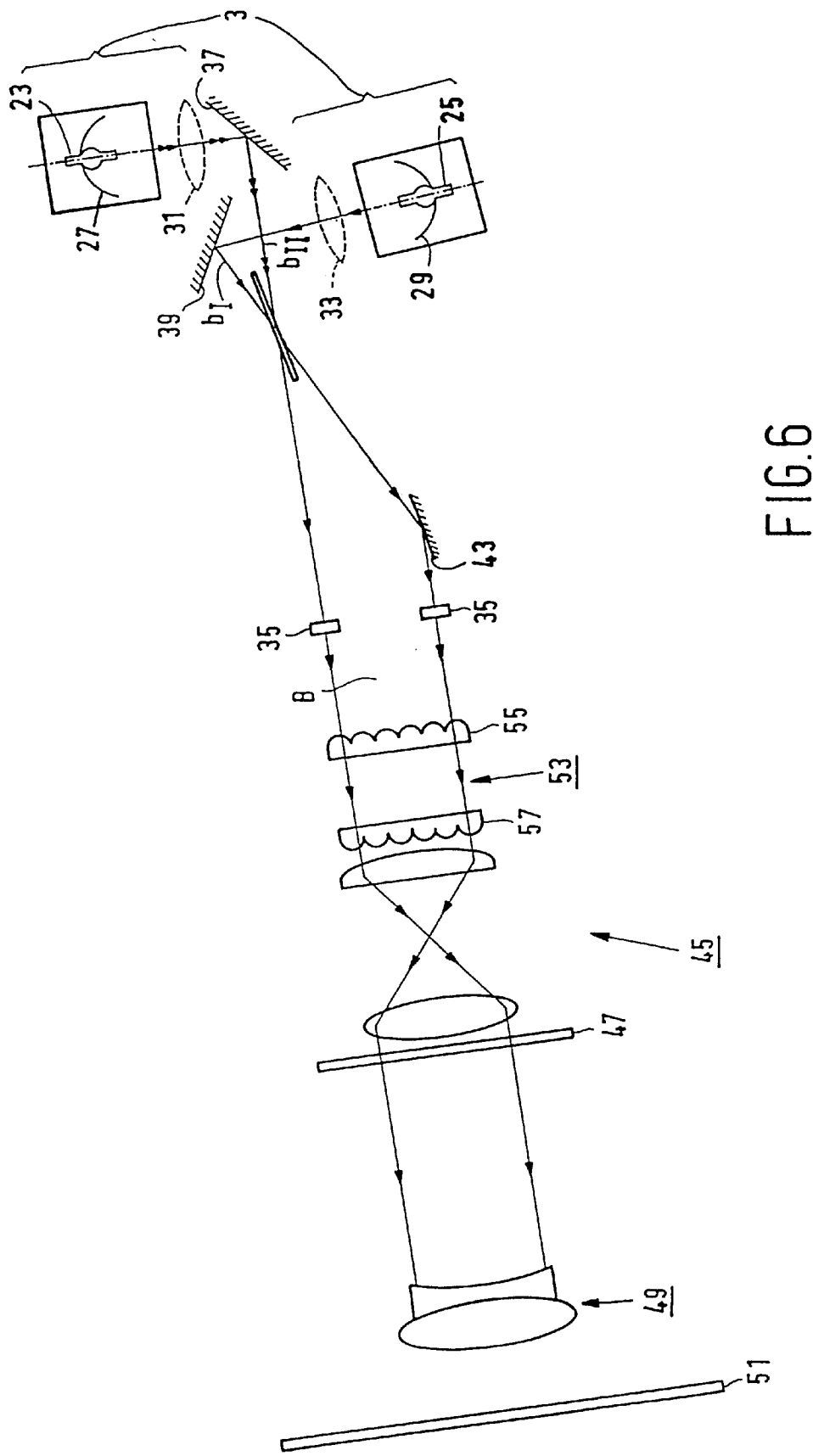
FIG. 6 shows diagrammatically an embodiment of an image projection device according to the invention.

FIG. 6 shows an embodiment of an image projection device 45 comprising an illumination system 21 according to the invention and an image display panel 47 for adding the image information to the radiation beam in conformity with an image to be projected. The display panel 47 is succeeded by a projection lens system 49 for projecting the image generated by the panel in a magnified form on a projection screen 51.

The display panel may be, for example a liquid crystal panel. Such a panel comprises a layer of liquid crystalline material which is enclosed between two optically transparent plates. A drive electrode is provided on each of these plates. These electrodes may be divided into a large number of rows and columns so that a large number of pixels in the display panel is defined. The different pixels can be driven by driving the matrix electrodes. Thus, a locally electric field can be applied at the desired positions across the liquid crystalline material. Such an electric field causes a change of the effective refractive index of the material so that the light passing through a given pixel undergoes or does not undergo a rotation of the direction of polarization, dependent on the presence or absence of an electric field at the location of the relevant pixel.

Instead of this passive-drive display panel, an active-drive panel may be used. In the last-mentioned display panel, one of the supporting plates comprises an electrode, while the other plate is provided with the semiconductor drive electronics. Each pixel is now driven by its own active drive element such as, for example a thin-film transistor. Both types of direct-drive image display panels are described in, for example European patent application EP 0 266 184, to which U.S. Pat. No. 4,995,702 corresponds.

For such a display panel, the incident beam should be polarized because the image information is added by modulating this direction of polarization. A voltage is applied to each pixel of the display panel, which voltage corresponds to the image information present at that location. Per pixel, the direction of polarization of the radiation incident on the relevant pixel is thus modulated in conformity with the image information to be displayed by this pixel. The illumination system according to the invention provides a possibility of supplying a polarized beam to the display panel for which substantially the full intensity of the radiation beam supplied by the radiation source is utilized.

If the image projection device is a color image projection device, the device comprises three display panels, one for each of the primary colors red, green and blue, and also a number of dichroic mirrors which split the linearly polarized beam into a red, a green and a blue beam each incident on an associated panel. The beams modulated by these panels are subsequently recombined to one beam by a further set of dichroic mirrors, which beam is displayed as an image on the projection screen by the projection lens system.

It is alternatively possible to use a single color display panel in a color image projection device. Then, a matrix of dichroic mirrors arranged in front of the pixels is preferably used, as is described in, for example U.S. Pat. No. 5,029,986 for the display panel of a direct-view display device.

The display panel may also be a DMD (Digital Micromirrored Device) panel instead of an LCD (Liquid Crystal Display) panel. A DMD is a semiconductor element which is made of a single silicon wafer and comprises a matrix of deformable mirror elements. Each mirror element may tilt in conformity with a voltage applied thereto. In this way, radiation incident on the matrix of mirror elements is reflected into or out of the projection system at different angles. Subsequently, the radiation reflected into the system is concentrated to a beam by means of an optical system and converted into a projected image via a projection lens system. The operation of such a panel is not based on modulation of the state of polarization of the incident radiation, but the image information to be reproduced is derived from the angles at which the incident radiation has been reflected by the mirror elements.

When a linearly polarized beam is presented to a DMD panel, the state of polarization will not change due to the addition of image information, in other words, due to the adjustment of the reflection angles of the mirror elements. This means that the beam provided with image information still has the same state of polarization as the beam which is supplied by the illumination system.

It is now proposed to use a polarizing image projection screen 51 having a direction of polarization which corresponds to that of the beam supplied by the illumination system. A polarizing image projection screen is a screen reflecting only radiation of a given direction of polarization towards the viewer, when a front view screen is used, or transmitting radiation, when a rear view screen is used. Radiation having a different direction of polarization is blocked for the viewer. Substantially 50% of ambient light which is unpolarized will be blocked, whereas substantially all signal light having a direction of polarization which corresponds to that of the screen will reach the viewer. In this way, an image having a considerably raised contrast can be obtained. An example of a polarizing projection screen provided with a circular polarizer is described in the Belgian patent application BE 09301042, to which U.S. Pat. No. 5,486,884 corresponds. An example of a polarizing projection screen comprising a linear polarizer is described in European patent specification EP-B 0 295 913, to which U.S. Pat. No. 4,928,123 corresponds.

Furthermore, an optical integrator 53 may be arranged between the illumination system 1 and the display panel 21. The integrator comprises a first lens plate 55 and a second lens plate 57. Lenses 59 and 61 may be arranged behind the second lens plate 57, which lenses ensure that all integrator lens images are correctly superimposed in the plane of the display panel 47 and that the display panel is correctly imaged on the projection screen. Such an integrator 53 is known from, for example U.S. Pat. No. 5,098,184 to which reference is made for a detailed description.

Use of the known optical integrator in an illumination system according to the invention has an extra advantage. Since the linearly polarized beam which will illuminate the display panel is a combination of two sub-beams each of which has covered a different path between the radiation source unit 3 and the location where they are combined to a single beam, the intensity distribution across this beam will not be constant. However, by using an integrator system, it is possible to distribute the intensity uniformly across the total light beam.

What is claimed is:

1. An illumination system for supplying a polarized radiation beam, which system comprises two radiation sources and an optical system for concentrating the radiation from each said source to a beam, a common polarizing system for splitting the beams generated by the radiation sources into linearly polarized sub-beams, and at least one polarization-rotating element, the polarizing system comprising at least one optically transparent plate having a refractive index $n_0$ and a first face and a second face, while at least one of said faces is provided with an optically thin layer having a refractive index $n_1$ which is larger than $n_0$, the light path of at least one of the sub-beams incorporating a reflector for reflecting said sub-beam into the same direction of propagation as that of the other sub-beam, and the chief ray of each said beam and the normal on the plate enclosing an angle which is substantially equal to the Brewster angle which holds for the interface between the optically thin layer and a medium surrounding the polarizing system.

2. An illumination system as claimed in claim 1 wherein the radiation sources are high-pressure mercury vapor discharge lamps comprising a lamp vessel of quartz glass, a part of which surrounds a discharge space;

tungsten electrodes provided in the lamp vessel, which electrodes are separated from each other, define a discharge path and are connected to current conductors extending beyond the lamp vessel;

a filling of at least 0.2 mg $Hg/mm^3$, $10^{-6}$–$10^{-4}$ $\mu$mol $Hal/mm^3$, in which Hal is one of the materials from the group of Cl, Br and I, and a rare gas in the lamp vessel, the discharge space having a spheroid shape with a dimension S in the direction of the discharge path and being equal to $S(mm) = e \cdot D_i$ in which e has a value in the range between 1.0 and 1.8, $D_i(mm) = f \cdot [3.2 + 0.011 \ (mm/W) \cdot P(W)]$ in which $D_i$ is the largest value of the diameter perpendicular to the discharge path, f has a value in the range between 0.9 and 1.1, P is the power used at nominal operation in the range between 70 and 200 W, the part of the lamp vessel surrounding the discharge space has a convex outer surface which, in a plane in which $D_i$ is located, has a diameter $D_0$ which is given by $D_0(mm) \geq 3.2 + 0.055 \ (mm/W) \cdot P(W)$, the length of the discharge path $D_P$ is in the range between 1.0 and 2.0 mm and the selected halogen is Br.

3. An image projection device comprising an illumination system for supplying a polarized radiation beam, at least one display panel arranged in the path of this beam for generating an image to be projected, and a projection lens system for projecting the image on a projection screen, two radiation sources and an optical system for concentrating the radiation from each said source to a beam, a common polarizing system for splitting the beams generated by the radiation sources into linearly polarized sub-beams, and at least one polarization-rotating element, the polarizing system comprising at least one optically transparent plate having a refractive index no and a first face and a second face, while at least one of said faces is provided with an optically thin layer having a refractive index $n_1$ which is larger than $n_0$, the light path of at least one of the sub-beams incorporating a reflector for reflecting said sub-beam into the same direction of propagation as that of the other sub-beam, and the chief ray of each said beam and the normal on the plate enclosing an angle which is substantially equal to the Brewster angle which holds for the interface between the optically thin layer and a medium surrounding the polarizing system.

4. An image projection device as claimed in claim 3, characterized in that an optical integrator is arranged in the light path between the polarizing element and the display panel.

5. An image projection device as claimed in claim 3 wherein the display panel is a DMD panel and the projection screen is a polarizing screen having a direction of polarization which corresponds to the direction of polarization of the illumination beam supplied by the illumination system.

* * * * *